US011593859B2

(12) United States Patent
Kagiwada

(10) Patent No.: US 11,593,859 B2
(45) Date of Patent: Feb. 28, 2023

(54) DATA LINKAGE SYSTEM, METHOD AND PROGRAM

(71) Applicants: Yoshimitsu Kagiwada, Kanagawa (JP);
KEYSOFT, INC., Kanagawa (JP)

(72) Inventor: Yoshimitsu Kagiwada,
Ashigarakamigun Matsudamachi (JP)

(73) Assignees: Yoshimitsu Kagiwada,
Ashigarakamigun Matsudamachi (JP);
KEYSOFT, INC., Ashigarakamigun
Matsudamachi (JP)

( * ) Notice: Subject to any disclaimer, the term of this patent is extended or adjusted under 35 U.S.C. 154(b) by 294 days.

(21) Appl. No.: 16/632,874

(22) PCT Filed: Jul. 23, 2018

(86) PCT No.: PCT/JP2018/027580
§ 371 (c)(1),
(2) Date: May 25, 2020

(87) PCT Pub. No.: WO2019/022036
PCT Pub. Date: Jan. 31, 2019

(65) Prior Publication Data
US 2020/0286148 A1 Sep. 10, 2020

(30) Foreign Application Priority Data
Jul. 23, 2017 (JP) .............................. JP2017-142359

(51) Int. Cl.
*G06F 15/173* (2006.01)
*G06Q 30/0601* (2023.01)
(Continued)

(52) U.S. Cl.
CPC ....... *G06Q 30/0629* (2013.01); *G06F 9/4881* (2013.01); *G06F 16/258* (2019.01); *H04L 67/02* (2013.01)

(58) Field of Classification Search
None
See application file for complete search history.

(56) References Cited

U.S. PATENT DOCUMENTS 1,126,681 A * 2/1915 Hutsch ................... B60K 37/02
340/815.78

FOREIGN PATENT DOCUMENTS

JP 2010-39955 A 2/2010
JP 2011-159053 A 8/2011

OTHER PUBLICATIONS

Printed sheets of "Rakuten Ichiba", operated by Rakuten, Inc., retrieved on Jan. 22, 2020, Internet <URL: http://www.rakuten.co.jp>; cited in the specification and Printed sheets of "Rakuten Global Market", retrieved on Jan. 22, 2020, Internet <URL: https://global.rakuten.com/en/?scid=wi_jpn_topflag_global_en> attached as their English translation.

(Continued)

*Primary Examiner* — Thanh T Nguyen
(74) *Attorney, Agent, or Firm* — Metrolex IP Law Group, PLLC

(57) ABSTRACT

A data linkage system according to one or more embodiments may make it possible to allow data dealt by one system to be dealt by another system. The data linkage system according to one or more embodiments includes: an acquisition unit that acquires a first individual specification data from the one system; and a storage unit that stores a forward conversion rule for converting data having an individual specification to data having a standard specification. The data linkage system further includes a conversion unit that converts, with reference to the forward conversion rule, the first individual specification data to standard specification data, wherein the storage unit stores the converted standard specification data.

3 Claims, 7 Drawing Sheets

(51) Int. Cl.
*G06F 16/25* (2019.01)
*G06F 9/48* (2006.01)
*H04L 67/02* (2022.01)

(56) References Cited

OTHER PUBLICATIONS

International Search Report dated Oct. 23, 2018 for PCT/JP2018/027580.
The Japanese Office Action dated Aug. 3, 2022 in a counterpart Japanese patent application No. 2019-532617.

* cited by examiner

| ITEM URL |
| ITEM NAME |
| PRICE |
| STORE NAME |
| ITEM DESCRIPTION |
| KEYWORD |
| CATEGORY |
| ITEM IMAGE URL |
| STORE URL |
| MARKETPLACE SITE NAME |
| MARKETPLACE SITE URL |
| PRODUCTION AREA (STATE) |
| PRODUCTION AREA (CITY, COUNTY) |
| HISTORY |
| FESTIVAL |
| SIGHTSEEING |
| RETRIEVAL FREQUENCY |
| CLICK FREQUENCY |
| SORTING FLAG |

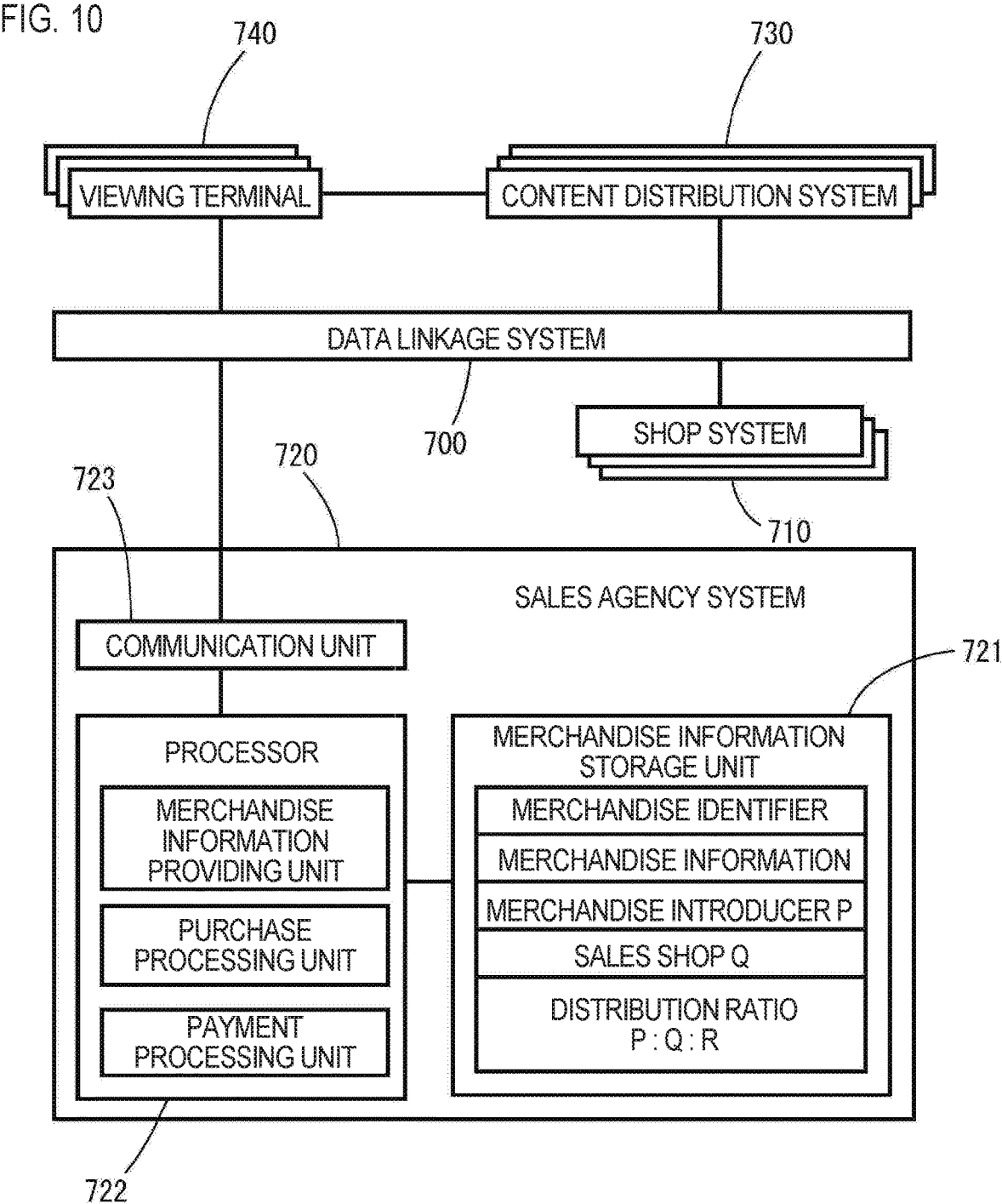

DATA LINKAGE SYSTEM, METHOD AND PROGRAM

TECHNICAL FIELD

The invention relates to a data linkage system, and particularly to a data linkage system for linking data between a plurality of systems that handle data having different specifications. The invention is also suitable for a merchandise purchase assist system that integrates merchandise sold at different sales sites and presents the merchandise to the consumer, and enables the consumer to compare and select the merchandise from the integrated sales sites.

BACKGROUND ART

The forms of marketplace sites to sell merchandise on the Internet include an online mall including online shops and an EC (Electric Commerce) site that mainly sells its own merchandise on a website operated by itself. The merchandise being sold at the EC site includes attractive merchandise such as local products. However, there is a problem that the merchandise from the EC site does not get increased sales, since the EC site has less chance that the merchandise gets noticed by consumers, than major online malls (for example, NON-PATENT LITERATURE 1). On the other hand, when an operator of the EC site opens a store in the major online mall in an attempt to increase sales chance, costs such as a commission fee are increased rather, which may lead to the red.

Moreover, the consumers may compare online malls and EC sites to purchase certain merchandise. However, interfaces for finding target merchandise vary among online malls and EC sites. For this reason, it takes a lot of effort for the consumers to find the target merchandise from a large number of shops and compare the merchandise.

For example, the inventor of this application has had a hard time comparing ten reservation sites to make a hotel reservation for a business trip. Particularly, most of smaller hotels are not included in major reservation sites and the like, and it is difficult to even reach reservation sites of such smaller hotels. Moreover, there is even no marketplace site presenting merchandise gathered from major merchandise marketplace sites.

In addition, in order to allow data of one site A to be handled by another site B having a different data specification, conventionally, one linkage system for linking data between the sites A and B is needed. In order to further increase the number of sites and link the three sites A, B, and C having different data specifications, three linkage systems are needed, which includes a linkage system between the sites A and B, a linkage system between the sites B and C, and a linkage system between the sites A and C. In order to link an X number of sites whose specifications are different from each other, an $X(X-1)/2$ number of linkage systems are needed. Thus, it is difficult to link a large number of sites.

Note that many online malls provide affiliate services. The affiliate services may be provided by the companies of the online malls themselves or may be provided by an affiliate service provider (ASP).

In this disclosure, the term "merchandise" also includes providing services.

PRIOR ART DOCUMENT

Patent Literature

NON-PATENT LITERATURE 1: "Rakuten Ichiba", operated by Rakuten, Inc., searched on Feb. 21, 2015, <URL: http://www.rakuten.co.jp>

SUMMARY OF THE INVENTION

Problem to be Solved by the Invention

An object of the invention is to improve the disadvantages of the conventional example, and in particular to realize a data linkage between systems by converting data handled by one system into data that can be handled by another system.

Means for Solving the Problem

In order to solve the problem, the invention is a data linkage system for allowing data handled by one system to be handled by another system, the data linkage system including an acquisition unit that obtains data having a first individual specification from one system and a storage unit that stores therein a forward conversion rule to convert data having an individual specification to data having a standard specification. The data linkage system further includes a conversion unit that converts, with reference to the forward conversion rule, the data having the first individual specification to data having the standard specification, wherein the storage unit stores the converted data having the standard specification.

With this, various specification data obtained from individual systems are uniformly converted to standard specification data.

Effect of the Invention

According to the invention, it is possible to realize a data linkage between systems by converting data handled by one system into data that can be handled by another system.

BRIEF DESCRIPTION OF DRAWINGS

FIG. 10 is a block diagram of a merchandise purchase system using a data linkage system.

EMBODIMENTS TO CURRY OUT THE INVENTION

A data linkage system according to the invention is also incorporated in a merchandise purchase assist system described below. However, the data linkage system according to the invention is not limited to be applied to the merchandise purchase assist system described below, but realizes a data linkage between various systems. Hereinafter, a merchandise purchase assist system is described first, and then a configuration of a data linkage system incorporated therein is described.

[Merchandise Purchase Assist System]

With reference to the drawings, a merchandise purchase assist system according to an embodiment is described below.

Figure 1:
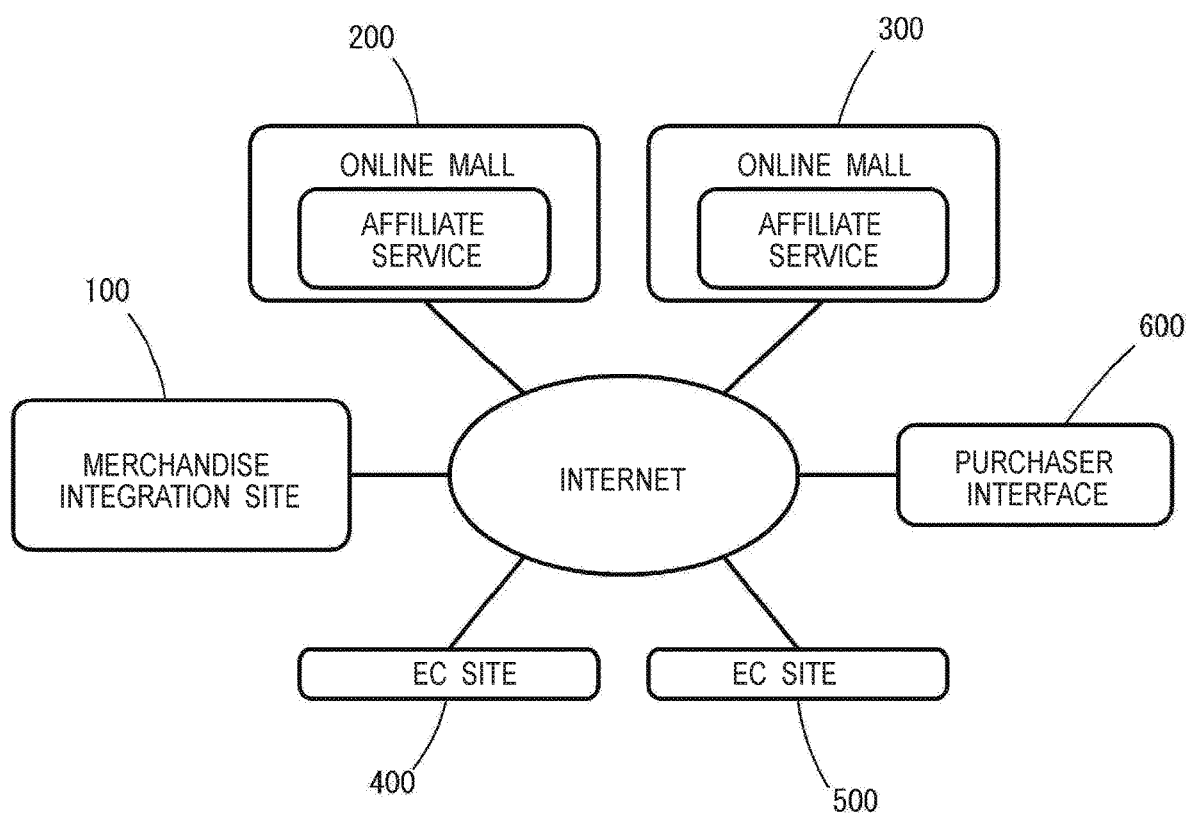
FIG. 1 is an overall configuration diagram of an embodiment of the invention.

As illustrated in FIG. 1, online mall systems 200 and 300 and EC site systems 400 and 500 are connected on the Internet. Also, a merchandise integration site system 100 and a purchaser interface system 600 are connected on the Internet. In the following description, the word "system" is omitted.

The online malls 200 and 300, the EC sites 400 and 500, and the merchandise integration site 100 each includes a web server. The purchaser interface 600 executes a web browser to display a webpage on a display device according to a program received from the web server of the merchandise integration site 100. The purchaser interface 600 also displays webpages, as needed, on the display device according to programs received from the web servers of the online malls 200 and 300 or the EC sites 400 and 500. Moreover, the purchaser interface 600 transmits predetermined information to a predetermined web server based on an input operation by a user.

The online malls 200 and 300 provide affiliate services. The merchandise integration site 100 uses the affiliate services provided by the online malls 200 and 300 to publicize merchandise sold at the respective online malls 200 and 300 on the webpages. The merchandise integration site 100 also stores information on merchandise sold at the EC sites 400 and 500, and publicizes the merchandise sold at the EC sites on the webpages.

The purchaser interface 600 displays the webpages acquired from the web server of the merchandise integration site 100, thereby displaying the merchandise sold at the online malls 200 and 300 and the merchandise sold at the EC sites 400 and 500 while integrating the both into a single webpage. Thus, the user of the purchaser interface 600 can easily compare the merchandise from different distributors. The merchandise integration site 100 has functions to cross-search for the merchandise from the online malls 200 and 300 and the merchandise from the EC sites 400 and 500 according to a condition sent from the purchaser interface 600, and to integrate merchandise selected from among the merchandise from the respective online malls and the merchandise from the respective EC sites into a single webpage.

Here, merchandise from more than one EC site that does not perform affiliate services is normally not integrated into a single webpage. Such an attempt to integrate the merchandise from more than one site into a single webpage (hereinafter referred to as the integrated page) is driven by an incentive acting on a provider of the integrated page to gain rewards from the affiliate services. On the other hand, since no affiliate rewards are expected even though merchandise from more than one EC site that does not perform affiliate services is integrated, a service to integrate the merchandise from more than one EC site that does not perform affiliate services into a single webpage for search is normally not performed.

[Hardware of Each System]

Each of the systems 100 to 600 includes a processing device, a storage device, an input device, a display device, and a communication device. Operations and functions of each system are realized by the processing device, including CPU (Central Processing Unit), executing programs. Information to be used by the processing device for processing is read from the storage device. Then, information processed by the processing device is stored in the storage device. A system user inputs information through the input device. Such information is presented to the system user through the display device. Transmission and reception of information between the respective systems are performed through the communication device. The processing device, the storage device, the input device, and the display device may cooperate with each other in a distributed state in a network environment. More than one processing device and more than one storage device may be provided. More than one processing device or more than one storage device may cooperate with each other in a distributed state in a network environment.

[Cross-Search Function]

Figures 2, 3:
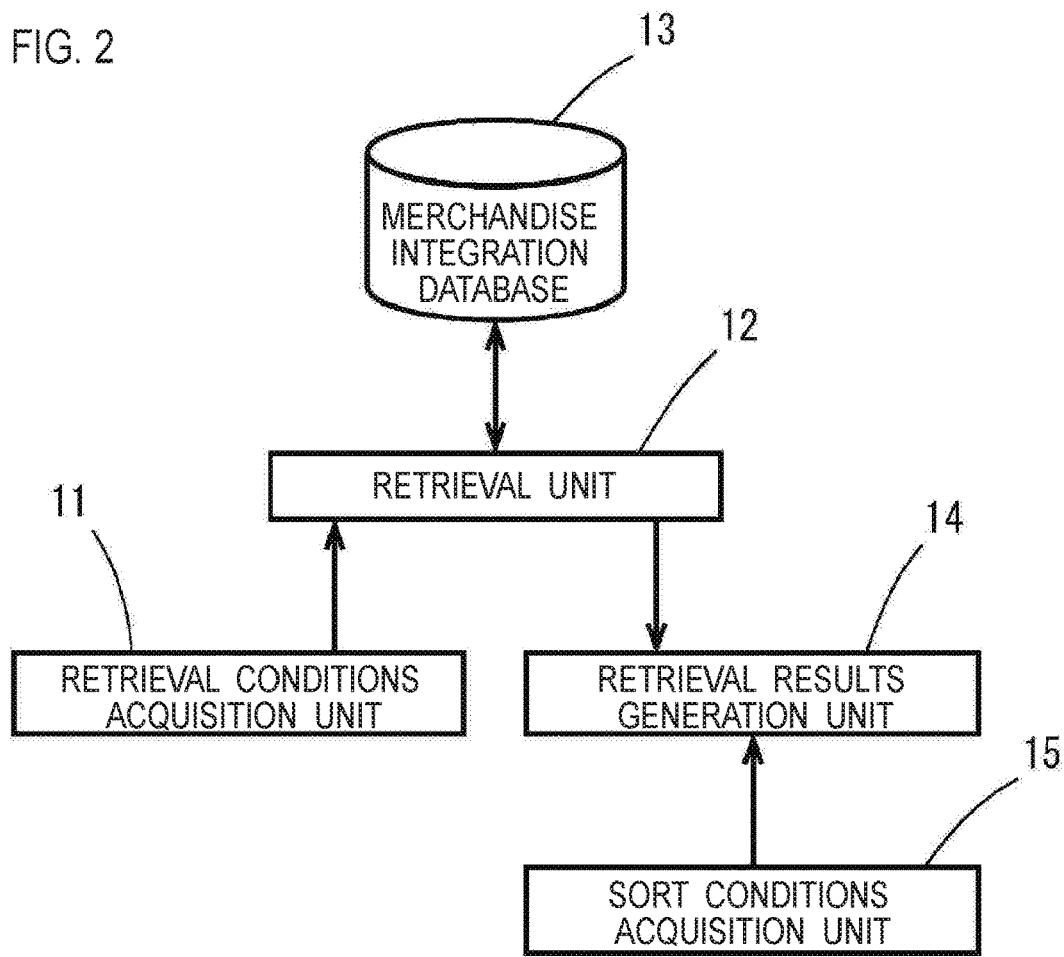
FIG. 2 is a configuration diagram of a cross-search function.
FIG. 3 is a view illustrating a data structure of merchandise-related information on merchandise that is a target for affiliate services.

The merchandise integration site 100 executes a cross-search function. FIG. 2 is a configuration diagram of the cross-search function. A retrieval conditions acquisition unit 11 acquires retrieval conditions from the purchaser interface 600, and hands over the retrieval conditions to a retrieval unit 12. The retrieval unit 12 retrieves, from a merchandise integration database (DB) 13, merchandise-related information that meets the retrieval conditions handed over from the retrieval conditions acquisition unit 11, and hands over the retrieved merchandise-related information to a retrieval results generation unit 14.

Figures 4, 5:
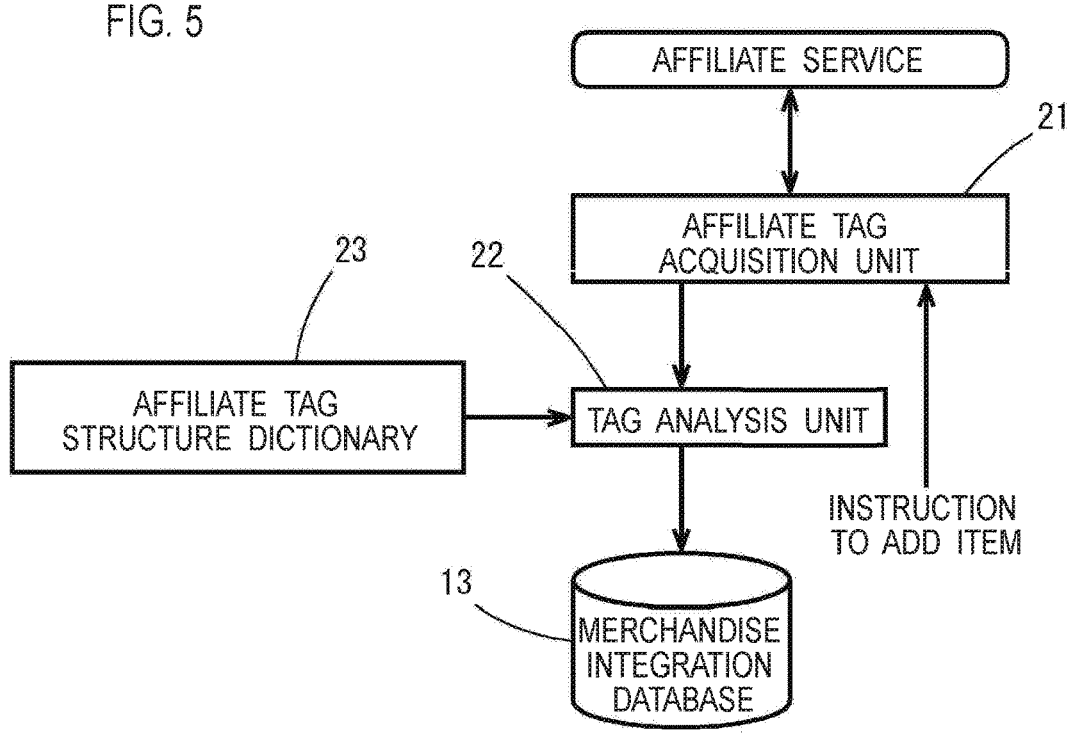
FIG. 4 is a view illustrating a data structure of merchandise-related information on merchandise that is not a target for affiliate services.
FIG. 5 is a configuration diagram of a merchandise adding function to add merchandise that is a target for affiliate services.

FIGS. 3 and 4 are views each illustrating a data structure of merchandise-related information stored in the merchandise integration DB 13. FIG. 3 illustrates a data structure of merchandise-related information on merchandise sold at a site that performs affiliate services. Such merchandise corresponds to merchandise sold at the online malls 200 and 300 in this embodiment, and data association illustrated in FIG. 3 is stored for each piece of merchandise. More specifically, for each piece of merchandise, keyword, category, merchandise name, price, merchandise description, affiliate tag, retrieval frequency for merchandise, click frequency, and sorting flag are associated with each other. The sorting flag is a flag that serves as a mark for integrating only merchandise with a common flag on into a single webpage.

FIG. 4 illustrates a data structure of merchandise-related information on merchandise sold at a site that performs no affiliate services. Such merchandise corresponds to merchandise sold at the EC sites 400 and 500 in this embodiment, and data association illustrated in FIG. 4 is stored for each piece of merchandise. More specifically, for each piece of merchandise, merchandise URL (URL of merchandise marketplace page), merchandise name, price, store name, merchandise description, keyword, category, merchandise image URL, store URL, marketplace site name, marketplace site URL, production area (prefecture), production area (city, town, village), history information about merchandise, festival information about merchandise, sightseeing information about merchandise, retrieval frequency for merchandise, click frequency, and sorting flag are associated with each other.

Upon receipt of a retrieval word or a retrieval image as a retrieval condition from the retrieval conditions acquisition unit 11, the retrieval unit 12 retrieves, from the merchandise integration DB 13, merchandise-related information including a word corresponding to the retrieval word or an image corresponding to the retrieval image. In other words, merchandise-related information including a word corresponding to the retrieval word or an image corresponding to the retrieval image is retrieved from merchandise-related information on each merchandise with the data structures illustrated in FIGS. 3 and 4. The image is acquired from an image URL included in the affiliate tag in FIG. 3 or from the merchandise image URL in FIG. 4.

Alternatively, upon receipt of a sorting flag designated as a retrieval condition from the retrieval conditions acquisition unit 11, the retrieval unit 12 retrieves, from the merchandise integration DB 13, merchandise-related information associated with a sorting flag corresponding to the sorting flag. In other words, merchandise-related information including the corresponding sorting flag is retrieved from merchandise-related information on each merchandise with the data structures illustrated in FIGS. 3 and 4. The sorting flag represents a group such as "recommended product" and "campaign product", for example.

Alternatively, upon receipt of a price range designated as a retrieval condition from the retrieval conditions acquisition unit 11, the retrieval unit 12 narrows down the retrieval results to only merchandise-related information with the price included in the price range.

When merchandise-related information that is a hit as the retrieval result is the merchandise-related information illustrated in FIG. 3 that addresses affiliate services, the retrieval unit 12 extracts an affiliate tag from the merchandise-related information, and hands over the affiliate tag to the retrieval results generation unit 14.

On the other hand, when merchandise-related information that is a hit is the merchandise-related information illustrated in FIG. 4 that does not address affiliate services, the retrieval unit 12 reads the merchandise URL, merchandise name, price, merchandise description, and merchandise image URL from the merchandise-related information, and hands over the read information to the retrieval results generation unit 14.

Upon acquisition of the affiliate tag from the retrieval unit 12, the retrieval results generation unit 14 inserts the affiliate tag (affiliate part) into a retrieval results display webpage. Upon acquisition of more than one affiliate tag from the retrieval unit 12, the retrieval results generation unit 14 makes a list of merchandise by inserting the affiliate tags into the retrieval results display webpage.

Alternatively, upon acquisition of the merchandise URL, merchandise name, price, merchandise description, and merchandise image URL (hereinafter referred to as the "merchandise-publicizing materials") from the retrieval unit 12, the retrieval results generation unit 14 uses these merchandise-publicizing materials to generate a merchandise-publicizing tag (merchandise-publicizing part) corresponding to the affiliate tag, and inserts the merchandise-publicizing tag into the retrieval results display webpage described above. The merchandise-publicizing part is configured, as an example, such that the merchandise name, price, and merchandise description are displayed, the merchandise image read from the merchandise image URL is displayed, and, when the merchandise-publicizing part is clicked, a merchandise marketplace page corresponding to the merchandise URL is displayed in another frame of the browser. Upon acquisition of the merchandise-publicizing materials corresponding to more than one merchandise from the retrieval unit 12, the retrieval results generation unit 14 makes a list of merchandise by generating merchandise-publicizing parts for each merchandise and inserting the generated merchandise-publicizing parts into the retrieval results display webpage described above.

A sorting conditions acquisition unit 15 receives a condition for sorting the retrieval results from the purchaser interface 600, and hands over the condition to the retrieval results generation unit 14. The retrieval results generation unit 14 sorts the affiliate parts and merchandise-publicizing parts to be listed as described above in order of price, retrieval frequency or click frequency, based on the sorting condition received from the sorting conditions acquisition unit 15.

Thus, the retrieval results generation unit 14 generates a retrieval results display webpage that combines the merchandise from the online malls 200 and 300 that perform affiliate services with the merchandise from the EC sites 400 and 500 that do not perform affiliate services on a single webpage. The retrieval results display webpage may be more than one page.

Then, the retrieval results generation unit 14 transmits the generated retrieval results display webpage to the purchaser interface 600 through the web server. Thus, the user of the purchaser interface 600 can view the retrieval results display webpage that combines the merchandise from the online malls 200 and 300 that perform affiliate services with the merchandise from the EC sites 400 and 500 that do not perform affiliate services on a single webpage, and can easily compare the merchandise displayed on the webpage. Furthermore, the user can purchase the merchandise by moving to the merchandise marketplace page from links attached to the displayed affiliate parts or merchandise-publicizing parts.

The operations of the retrieval conditions acquisition unit 11, the retrieval unit 12, the retrieval results generation unit 14, and the sorting conditions acquisition unit 15 are realized by the processing device in the merchandise integration site 100 executing programs. The merchandise integration DB 13 is stored in the storage device of the merchandise integration site 100.

[Online Mall Merchandise Adding Function]

Next, description is given of a function to register the merchandise from the online malls 200 and 300 that perform affiliate services with the merchandise integration DB 13. FIG. 5 is a configuration diagram of the merchandise adding function.

(First Operation)

An affiliate tag acquisition unit 21 in the merchandise integration site 100 receives an instruction to add merchandise from an arbitrary system having the authority to add merchandise. The instruction to add merchandise has a previously acquired affiliate tag attached thereto. The affiliate tag acquisition unit 21 acquires the affiliate tag attached to the instruction to add merchandise, and hands over the affiliate tag to a tag analysis unit 22. The tag analysis unit 22 acquires an identifier (for example, domain) of the affiliate service from the description of the affiliate tag. For this purpose, it is conceivable that identifiers of affiliate services are pre-registered in a dictionary and, when the tag analysis unit 22 finds in the affiliate tag an identifier that matches the identifier registered in the dictionary, the identifier is acquired as the identifier of the affiliate service.

The tag analysis unit 22 extracts the merchandise name, price, and merchandise description from the affiliate tag by referring to an affiliate tag structure dictionary 23. For this purpose, the identifier of the affiliate service and the structure of the affiliate tag (information indicating where in the tag the merchandise name, price, and merchandise description are described) are associated with each other and pre-registered in the affiliate tag structure dictionary 23 for each affiliate service.

The tag analysis unit 22 registers the affiliate tag attached to the instruction to add merchandise and the merchandise name, price, and merchandise description extracted from the affiliate tag in the merchandise integration DB 13 in association with each other. Thus, a record of the merchandise-related information illustrated in FIG. 3 is added to the merchandise integration DB 13. Among the added merchandise-related information, the retrieval frequency and the click frequency have their initial values set to 0. When a keyword, category or sorting flag is attached to the instruction to add merchandise, such a keyword, category or sorting flag may be registered with the merchandise integration DB 13 in association with the affiliate tag.

The operations of the affiliate tag acquisition unit 21 and the tag analysis unit 22 described above are realized by the processing device in the merchandise integration site 100 executing programs. Also, each dictionary is stored in the storage device.

(Second Operation)

The affiliate tag acquisition unit 21 in the merchandise integration site 100 receives an instruction to add merchandise from an arbitrary system having the authority to add merchandise. A retrieval word for retrieving merchandise from an affiliate service is attached to the instruction to add merchandise. The affiliate tag acquisition unit 21 acquires, from the affiliate service, an affiliate tag of merchandise corresponding to the retrieval word attached to the instruction to add merchandise, through an automatic acquisition process such as crawler and autopilot. The affiliate tag acquisition unit 21 hands over the affiliate tag acquired through the automatic acquisition process and an identifier of the affiliate service that has generated the tag to the tag analysis unit 22.

The tag analysis unit 22 extracts the merchandise name, price, and merchandise description from the affiliate tag by referring to the affiliate tag structure dictionary 23. The identifier of the affiliate service and the structure of the affiliate tag (information indicating where in the tag the merchandise name, price, and merchandise description are described) are associated with each other and pre-registered in the affiliate tag structure dictionary 23 for each affiliate service.

The tag analysis unit 22 registers the affiliate tag acquired from the affiliate service and the merchandise name, price, and merchandise description extracted from the affiliate tag in the merchandise integration DB 13 in association with each other. Thus, the record of the merchandise-related information illustrated in FIG. 3 is automatically added to the merchandise integration DB 13. Among the added merchandise-related information, the retrieval frequency and the click frequency have their initial values set to 0. When a keyword or sorting flag is attached to the instruction to add merchandise, such a keyword or sorting flag may be registered with the merchandise integration DB 13 in association with the affiliate tag.

The operations of the affiliate tag acquisition unit 21 and the tag analysis unit 22 described above are realized by the processing device in the merchandise integration site 100 executing programs. Also, each dictionary is stored in the storage device. Moreover, the record of the merchandise-related information can be updated to latest data on a regular basis by storing in the storage device the retrieval word attached to the instruction to add merchandise and repeating the second operation described above based on the retrieval word on a regular basis by the processing device. During this record update, the values of the retrieval frequency and the click frequency before the update are maintained, rather than resetting the values.

(Third Operation)

The online malls 200 and 300 may provide a Web application programming interface (WebAPI). In this case, the processing device in the merchandise integration site system 100 receives an instruction to add merchandise from an arbitrary system having the authority to add merchandise. An identifier of the WebAPI and an input parameter to be handed over to the WebAPI are attached to the instruction to add merchandise. The processing device transmits the input parameter to a WebAPI corresponding to the WebAPI identifier, and receives an output parameter, as a response, including affiliate data from the WebAPI. It is assumed in this embodiment that, according to the specifications of the WebAPI, the merchandise-related information including the respective pieces of data illustrated in FIG. 3 associated with each other can be received as the output parameter. The processing device registers the merchandise-related information acquired from the WebAPI with the merchandise integration DB 13.

Thus, the record of the merchandise-related information illustrated in FIG. 3 is automatically added to the merchandise integration DB 13. Among the added merchandise-related information, the retrieval frequency and the click frequency have their initial values set to 0. When a keyword or sorting flag is attached to the instruction to add merchandise, such a keyword or sorting flag may be registered with the merchandise integration DB 13 in association with the affiliate tag (affiliate data).

The operations described above are realized by the processing device in the merchandise integration site 100 executing programs. Moreover, the record of the merchandise-related information can be updated to latest data on a regular basis by storing in the storage device the association between the identifier of the WebAPI attached to the instruction to add merchandise and the input parameter given to the WebAPI, and repeating the third operation described above, based on the identifier of the WebAPI and the input parameter given to the WebAPI, on a regular basis by the processing device. During this record update, the values of the retrieval frequency and the click frequency before the update are maintained, rather than resetting the values.

[EC Site Merchandise Adding Function]

Figure 6:
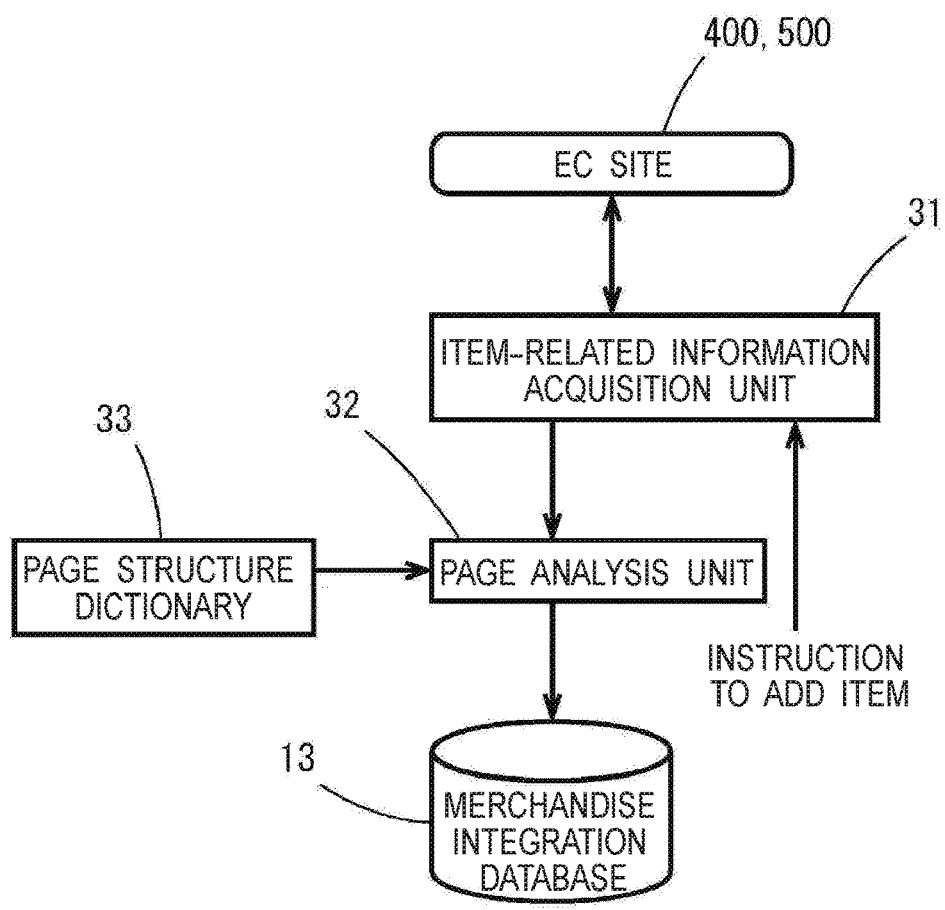
FIG. 6 is a configuration diagram of a merchandise adding function to add merchandise that is not a target for affiliate services.

Next, description is given of a function to register the merchandise from the EC sites 400 and 500 that do not perform affiliate services with the merchandise integration DB 13. FIG. 6 a configuration diagram of the merchandise adding function.

(First Operation)

A merchandise-related information acquisition unit 31 in the merchandise integration site 100 receives an instruction to add merchandise from an arbitrary system having the authority to add merchandise. The merchandise-related information described with reference to FIG. 4 is attached to the instruction to add merchandise. The merchandise-related information acquisition unit 31 acquires the merchandise-related information attached to the instruction to add merchandise, and registers the merchandise-related information with the merchandise integration DB 13. Thus, a record of the merchandise-related information illustrated in FIG. 4 is added to the merchandise integration DB 13. Among the added merchandise-related information, the retrieval frequency and the click frequency have their initial values set to 0. Here, the system that gives the instruction to add merchandise may be a computer operated by an EC site operator. The function of the merchandise-related information acquisition unit 31 may be provided by an "import WebAPI (Web Application Programming Interface)" provided by the integration site 100. The "import WebAPI" means a WebAPI that acquires merchandise-related information from an arbitrary system having the authority to add merchandise, and registers the acquired merchandise-related information with the merchandise integration DB 13. Although it has heretofore been technically difficult to import contents of minor sites without such an import mechanism, the use of such a new mechanism makes it possible to import information on minor sites (EC sites) and the like that do not perform affiliate services. A computer that sends the instruction to add merchandise may acquire merchandise-related information by importing information inputted by a user of the computer on a screen through a GUI.

The operations of the merchandise-related information acquisition unit 31 described above are realized by the processing device in the merchandise integration site 100 executing programs.

(Second Operation)

The merchandise-related information acquisition unit 31 in the merchandise integration site 100 receives an instruction to add merchandise from an arbitrary system having the authority to add merchandise. A URL of an EC site to be added is attached to the instruction to add merchandise. The merchandise-related information acquisition unit 31 acquires a marketplace page of each merchandise sold at the EC site to be added, through an automatic acquisition process such as crawler and autopilot, and hands over the marketplace page to a page analysis unit 32. Here, the system that gives the instruction to add merchandise may be a computer operated by an EC site operator. The function of the merchandise-related information acquisition unit 31 may be provided by the "import WebAPI" provided by the integration site 100. The page analysis unit 32 analyzes a source code of a marketplace page for each merchandise, and extracts the merchandise-related information illustrated in FIG. 4 from the page.

The page analysis unit 32 refers to a page structure dictionary 33 to extract the merchandise-related information from the source code of the marketplace page. In the page structure dictionary 33, an identifier of an EC site and the structure of the marketplace page of the EC site (information indicating where in the page each merchandise-related information illustrated in FIG. 4 is described) are associated with each other and pre-registered for each EC site. The page analysis unit 32 refers to the structure of the marketplace page associated with the identifier of the EC site to be added by reading the structure from the page structure dictionary 33. The page analysis unit 32 may extract each merchandise-related information by referring to metadata, a tag or an identifier in the tag, which is described in the marketplace page for each merchandise-related information. Alternatively, when the marketplace page uses Semantic Web technology, that is, merchandise-related information is extracted from a marketplace page described using an RDF or the like, or a marketplace page accompanied by a tag (back data) describing the meaning of data, there may be no need for the page structure dictionary 33. In this case, the page analysis unit can extract the merchandise-related information by using Semantic Web technology to interpret the meaning of data.

The page analysis unit 32 registers the extracted merchandise-related information with the merchandise integration DB 13 for each merchandise. Thus, the record of the merchandise-related information illustrated in FIG. 4 is automatically added to the merchandise integration DB 13. Among the added merchandise-related information, the retrieval frequency and the click frequency have their initial values set to 0.

The operations of the merchandise-related information acquisition unit 31 and the page analysis unit 32 described above are realized by the processing device in the merchandise integration site 100 executing programs. Also, the page structure dictionary 33 is stored in the storage device. Moreover, the record of the merchandise-related information can be updated to latest data on a regular basis by storing in the storage device the EC site URL (identifier) attached to the instruction to add merchandise and repeating the second operation described above based on the EC site URL on a regular basis by the processing device. During this record update, the values of the retrieval frequency and the click frequency before the update are maintained, rather than resetting the values.

Here, during the extraction of the merchandise-related information illustrated in FIG. 4 from the marketplace page of each merchandise in the second operation described above, the processing device in the merchandise integration site 100 may use Semantic Web technology. Semantic Web technology is a technology to enable a computer to efficiently collect and interpret information by adding, for a Web page and the contents described therein, information (metadata) indicating what the Web page and the contents mean, according to certain rules. In this case, the merchandise-related information automatically extracted from the merchandise marketplace page could be wrong. Therefore, in such a case, the processing device in the merchandise integration site 100 may include a revision function to display the merchandise-related information extracted using Semantic Web technology on a user interface of a terminal that has transmitted the instruction to add merchandise described above, to receive an instruction to correct the merchandise-related information from a terminal user who has confirmed the display, and to register, with the merchandise integration DB 13, the merchandise-related information corrected according to the received correction instruction.

[Personal Information Providing Function]

The user of the purchaser interface 600 views a retrieval results display webpage for merchandise and then moves to a marketplace page for the merchandise by clicking an affiliate part or merchandise-publicizing part of the merchandise that appears on the page. Furthermore, when having decided to purchase the merchandise, the user of the purchaser interface 600 proceeds with a purchase procedure for the merchandise from the marketplace page of the merchandise. In the purchase procedure, the user needs to enter his/her name and address to which the purchased merchandise is to be delivered. The merchandise integration site 100 provides the purchaser interface 600 with personal information, such as the name and address for delivery of the merchandise and payment information, and an automatic input program for automatically entering the personal information into an order form on the marketplace site. As software for automatically entering information into a web form, software for entering into a prize application form, for example, and the like are known. This personal information providing function is described below.

Figure 7:
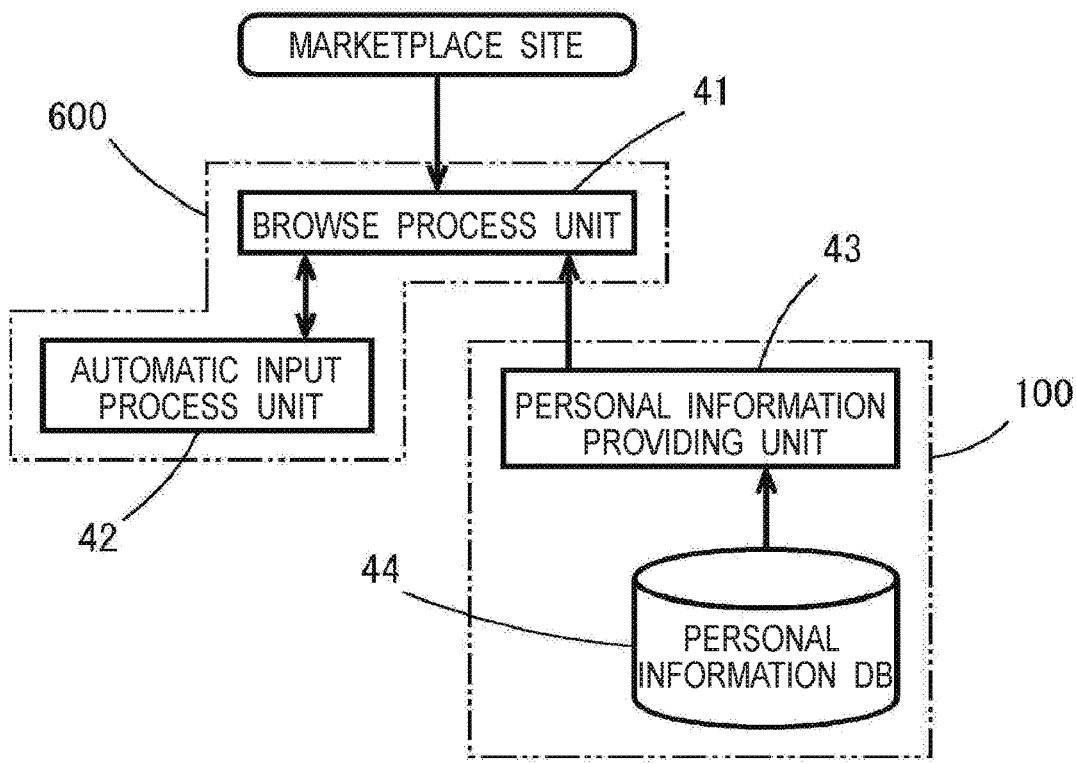
FIG. 7 is a configuration diagram of a personal information providing function.

FIG. 7 is a configuration diagram of the personal information providing function. Hereinafter, the online malls 200 and 300 and the EC sites 400 and 500 where the purchase procedure is performed are collectively referred to as the "marketplace site". In FIG. 7, the purchaser interface 600 includes a browsing processing unit 41 and an automatic input processing unit 42. Operations of the browsing processing unit 41 and the automatic input processing unit 42 are realized by the processing device of the purchaser interface 600 executing programs provided by the merchandise integration site 100. The automatic input program may be pre-installed in the purchaser interface 600.

The merchandise integration site 100 includes a personal information providing unit 43 and a personal information database (DB) 44. Operations of the personal information providing unit 43 are realized by the processing device of the merchandise integration site 100 executing programs. The personal information DB 44 is stored in the storage device. In the personal information DB, an identifier of an individual and personal information asked to be entered when purchasing merchandise, such as address, name, telephone number, and payment information of the individual, are stored in association with each other. Such personal information may be information on a representative of a group when merchandise is purchased by the group.

It is assumed, here, that the user of the purchaser interface 600, who uses the merchandise integration site 100, uses his/her personal identifier to previously log in to the merchandise integration site 100. Therefore, it is assumed that the merchandise integration site 100 specifies the identifier of the individual that is the user of the purchaser interface 600.

In the purchaser interface 600, the browsing processing unit 41 displays the retrieval results display webpage on the display device. Upon detection of an event that the affiliate part or merchandise-publicizing part displayed on the retrieval results display webpage is clicked by the input device, the browsing processing unit 41 acquires a merchandise marketplace page from a link attached to the part, and displays the marketplace page in a frame different from a display region where the retrieval results display webpage is opened.

The user of the purchaser interface 600 moves from the marketplace page to an order page (personal information input page) and then to a payment page (payment information input page) within the frame where the marketplace page for the online malls 200 and 300 or the EC sites 400 and 500 is opened. In this event, upon detection of an event of requesting automatic input from the input device, the browsing processing unit 41 requests the merchandise integration site 100 to provide personal information on the user of the purchaser interface 600. The event of requesting automatic input is, for example, a user operation showing agreement through the input device, in response to the question "Do you wish to automatically enter your personal information?". The personal information to be requested may be only a part of the personal information registered, such as the address only or the name only. Here, the browsing processing unit 41 may be configured to request the merchandise integration site 10 to provide the personal information described above, regardless of whether or not the event of requesting automatic input is detected.

In response to this request, the personal information providing unit 43 in the merchandise integration site 100 reads the personal information associated with the identifier of the user of the purchaser interface 600 from the personal information DB 44, and transmits the personal information to the purchaser interface 600. The browsing processing unit 41 in the purchaser interface 600 acquires the personal information transmitted from the merchandise integration site 100, and hands over the personal information to the automatic input processing unit 42.

Upon acquisition of the personal information, the automatic input processing unit 42 automatically enters relevant personal information into the form on the order page or payment page displayed within the frame. The user checks the automatically entered personal information, performs addition and correction as needed, and proceeds with the purchase procedure. This personal information providing function can provide the marketplace site with the personal information consolidated outside the marketplace site, thus making it possible to spare the user of the purchaser interface 600 the trouble of having to enter his/her personal information when purchasing merchandise.

[Ranking Function]

Next, a ranking function is described. In the above description of the cross-search function, the description is given of the fact that the retrieval results can be sorted by the retrieval frequency or the click frequency. Here, description is given of a function to update parameters of the retrieval frequency and the click frequency in the merchandise-related information stored in the merchandise integration DB 13.

Figure 8:
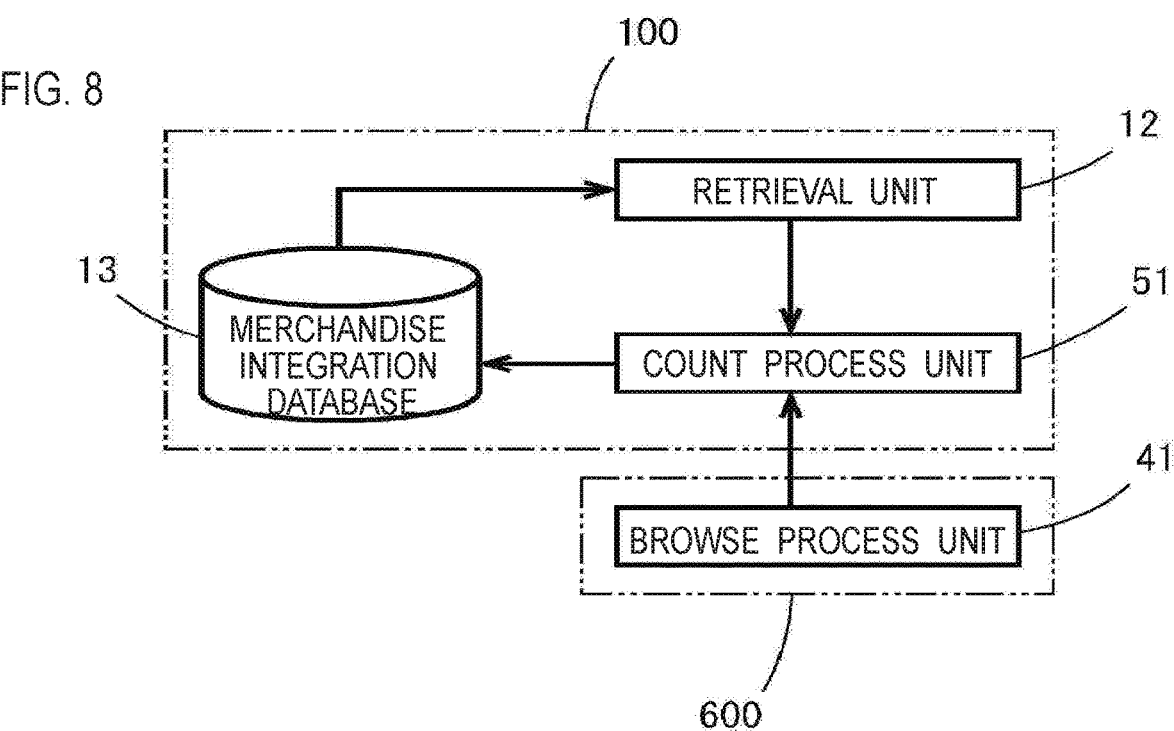
FIG. 8 is a configuration diagram of a ranking function.

FIG. 8 is a configuration diagram of the ranking function. The merchandise integration site 100 includes a count processing unit 51 in addition to the retrieval unit 11 and the merchandise integration DB 13 described above. Operations of the count processing unit 51 are realized by the processing device in the merchandise integration site 100 executing programs.

In the merchandise integration site 100, the count processing unit 51 updates the value of the retrieval frequency in the merchandise integration DB 13 by adding 1 to the value of the retrieval frequency among the merchandise-related information, for each of the merchandise retrieved by the retrieval unit 11 using the cross-search function described above.

Meanwhile, in the purchaser interface 600, when the user clicks on the affiliate part or merchandise-publicizing part, the browsing processing unit 41 detects the click event and transmits the identifier of the affiliate part or merchandise-publicizing part that has been clicked on to the merchandise integration site 100. In the merchandise integration site 100, the count processing unit 51 acquires the identifier of the part that has been clicked on, and updates the value of the click frequency in the merchandise integration DB 13 by adding 1 to the value of the click frequency among the merchandise-related information corresponding to the identifier of the part. For this purpose, the merchandise-related information in the merchandise integration DB 13 is previously associated with the identifier of the part, and each affiliate part or merchandise-publicizing part is previously associated with the identifier of the part within the retrieval results display webpage of the cross-search.

As described above, the retrieval results generation unit 14 sorts the affiliate parts and merchandise-publicizing parts to be listed in order of price, retrieval frequency or click frequency, based on the sorting condition received from the sorting conditions acquisition unit 15. In this event, as for the retrieval frequency and the click frequency, the retrieval frequency or click frequency added by the above processing is referred to.

Moreover, keywords and categories are connected to the merchandise-related information for the affiliate part or merchandise-publicizing part. Therefore, the merchandise integration site 100 may rank the keywords or categories with higher retrieval frequency or click frequency, based on the merchandise-related information, and provide the ranking to the purchaser interface 600. Accordingly, the purchaser of merchandise can be provided with the ranking of keywords or categories counted in a cross-sectoral manner through the sites of the online malls 200 and 300 that perform affiliate services and the EC sites 400 and 500 that do not perform affiliate services.

[Cooperation with Transaction Management System]

The inventor of this application has invented a transaction management system disclosed in Japanese Patent Application Publication No. 2012-178147. This transaction management system may manage transactions through marketplace sites such as the EC sites 400 and 500.

[Equipped with ASP Function]

The merchandise integration site 100 may be equipped with a function as an affiliate service provider having the configuration described above.

More specifically, the merchandise integration site 100 includes: a storage unit that stores partner IDs and affiliate rewards corresponding to the respective partner IDs; a transmission unit that generates a link code connecting merchandise-related information requested by a partner with the ID of the partner, and transmits the link code to the partner; and an execution unit that registers affiliate result rewards in the storage unit in association with the partner ID connected with the link code when merchandise corresponding to the link code is purchased by accessing the link code.

With the merchandise integration site 100 equipped with the affiliate service provider function, the sales by using affiliate services can be improved particularly for merchandise from EC sites that have not introduced the affiliate services.

[Affinity for Internet of Things (IoT)]

When a device (for example, refrigerator) connected to the Internet purchases merchandise on behalf of a consumer, where to purchase the merchandise is limited by the aptitude of specifications of the device and specifications of a marketplace site to purchaser the device. Due to the affiliation between a refrigerator manufacturer and a well-known marketplace site (for example, Rakuten Ichiba, Amazon, and the like), the refrigerator is normally purchased from a specific major shopping mall, and unlikely to be purchased from any other minor sites. On the other hand, if the device is purchased from the merchandise integration site of the invention, the merchandise integration sites includes both merchandise sold at the major shopping mall and merchandise from the minor sites. Moreover, since it is easy for new minor sites to register merchandise with the merchandise integration site, the device connected to the Internet can automatically purchase merchandise from among a wide range of options of where to purchase, including the minor sites.

Likewise, by connecting a vending machine installed in a station or the like to the Internet, the vending machine can purchase from the merchandise integration site of the invention (the vending machine in this case sells merchandise that is not available in the machine). Accordingly, the vending machine can sell merchandise sold at a local site, merchandise sold at a site of chamber of commerce, and the like in a cross-sectoral manner.

[Data Linkage System]

Figure 9:
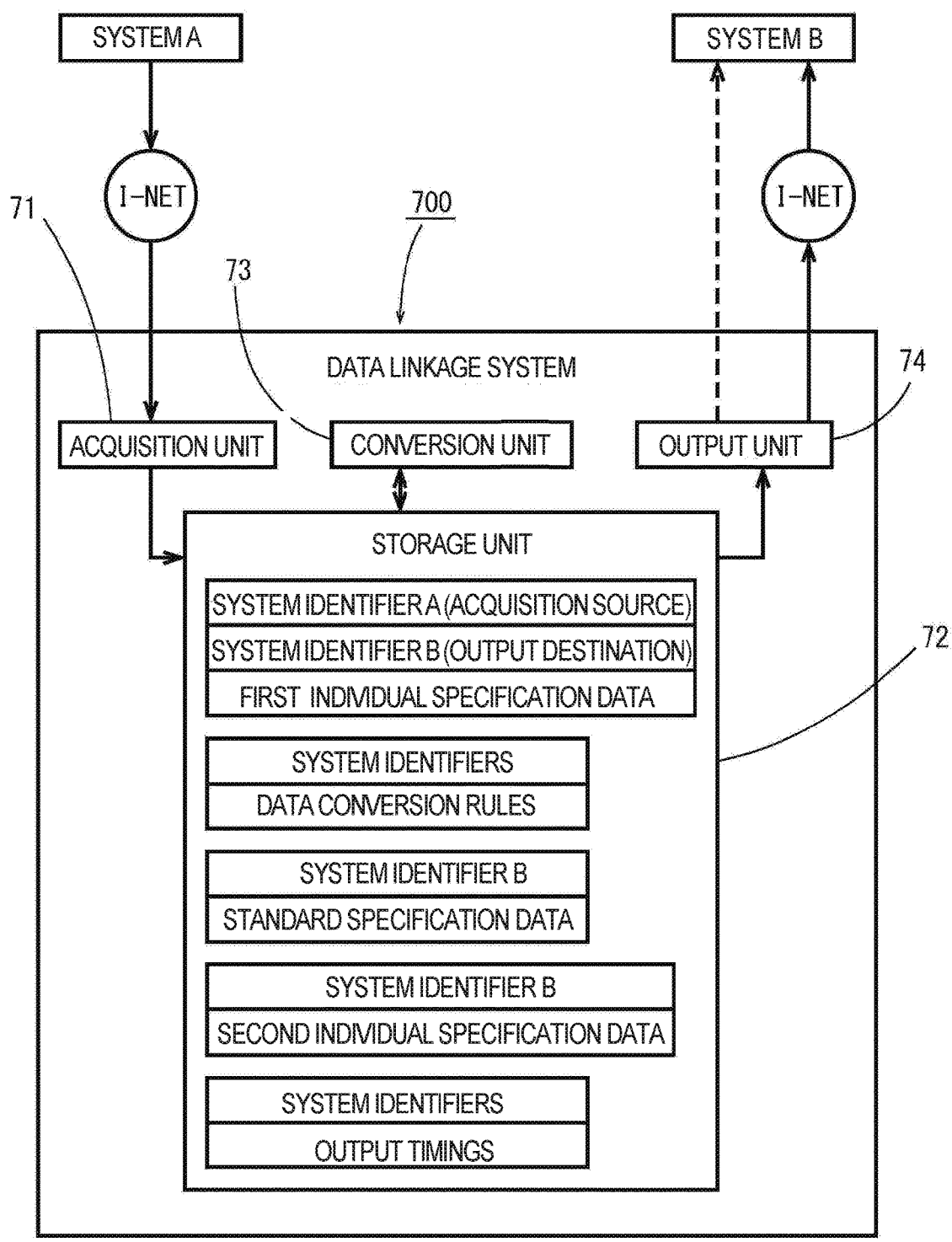
FIG. 9 is a block configuration diagram of a data linkage system according to an embodiment of the invention.

Next, an embodiment of a data linkage system, which is also used in the above-described merchandise purchase assist system, is described. In FIG. 9, a data linkage system 700 includes an acquisition unit 71, a storage unit 72, a conversion unit 73, and an output unit 74. The acquisition unit 71, the conversion unit 73, and the output unit 74 are realized by a processor executing a program. The storage unit 72 is provided in a storage area of a storage device such as a hard disk drive or the like. The data linkage system 700 may be realized by cooperation of a plurality of processors. Systems A and B respectively process data having different specifications. Data having different specifications handled by the systems A and B are referred to as "individual specification" data. A unified specification of data managed by the data linkage system 700 is referred to as "standard specification". There are a plurality of systems A and a plurality of systems B on the Internet. A certain system can become a system A and also can become a system B.

The acquisition unit 71 acquires, from the system A through a communication device (not shown) and the internet (I-NET), data having a first individual specification, a system identifier A of the system A as an data acquisition source, and a system identifier B of the system B as an output destination after the data is converted, and stores these with being associated with each other in the storage unit 72. A system identifier is an identifier unique to each of the systems, which may be the system A or B. The acquisition unit 71 may automatically extract and acquire individual specification data from a web page of the system A by an optimized artificial intelligence (AI) process.

In a case where there are a plurality of output destination systems, a system identifier B may link the plurality thereof. In a case where the output destination is always limited to one system, the output unit 74 always sends data to a specific system B, and it is not always necessary to associate the system identifier B with each of the data. Further, in a case where a pair of an acquisition source system and an output destination system is fixed in advance, it is sufficient that the combination of the system identifiers A and B is registered in the storage unit 72 in advance, and this combination is not necessarily associated with each data.

Further, the storage unit 72 stores a system identifier and a data conversion rule in association with each other. The data conversion rules include a forward conversion rule and a reverse conversion rule. The forward conversion rule is a rule for converting individual specification data into standard specification data. The reverse conversion rule is a rule for converting standard specification data into individual specification data. The forward conversion rule for converting individual specification data of the system A into the standard specification data is associated with the system identifier of the system A. The reverse conversion rule for converting the standard specification data into the individual specification data of the system B is associated with the system identifier of the system B.

The conversion unit 73 reads out the first individual specification data associated with the system identifiers A and B from the storage unit 72, converts the first individual specification data into standard specification data, with reference to the forward conversion rule associated with the system A, and stores in the storage unit 72 the standard specification data associated with the system identifier B of the system B as an output destination.

Further, the conversion unit 73 reads out the standard specification data and the system identifier B associated with the standard specification data from the storage unit 72, converts the standard specification data into the second individual specification data, with reference to the reverse conversion rule associated with the system identifier B, and stores in the storage unit 72 the second individual specification data associated with the system identifier B.

The conversion means changing the type of data, the number of digits of data, the representation of data, or etc. without changing the meaning of contents of the data.

In the storage unit 72, the system identifier of the system B and the timing of outputting the data to the system B (output timing) are registered in association with each other. The output timing is a real time, a constant cycle, or the like. The real time means that the second individual specification data is output from the output unit 74 to the system B immediately after being stored in the storage unit 72. The constant cycle means that the second individual specification data linked to the system identifier B is periodically output from the output unit 74 to the system B at a predetermined time every day, every predetermined day of the week, or the like.

The output unit 74 monitors the output timing, and when the timing to output the data to the system B comes, reads the second individual specification data linked to the system identifier B from the storage unit 72 and outputs the second individual specification data to the system B. In a case where the system B is remote on the Internet, the output unit 74 transmits the second individual specification data to the system B via the communication device and the Internet. On the other hand, in a case where the system B is in the same computer as the computer that executes the data linkage system 700, the process of the output unit 74 passes the second individual specification data to the process of the system B. In a case where the system B is in the same local area network as the computer that executes the data linkage system 700, the output unit 74 transmits the second individual specification data to the system B via the communication device and the local area network.

Thereby, the data having the individual specification of the system A is converted into data having an individual specification which can be handled by the system B without changing the meaning of the contents of the data and the converted data is transmitted, so that the process can be advanced with linking the data between the systems A and B. Conventionally, for example, there is a case where chart data of one medical institution cannot be shared with another medical institution due to different data specifications between a system of the one medical institution and a system of said another medical institution. In order to share the data, it was necessary to change the existing system of either medical institution to match the data specifications. However, changing an existing system was expensive. In addition, even if a data sharing system is constructed between multiple systems, an existing system having a different data specification cannot newly participate, without preparing a new system that conforms to the data specification or preparing a new system that cooperate with it. On the other hand, when the data linkage system of the invention is used, a plurality of existing systems can share data via the data linkage system, as long as they are linked with the data linkage system. According to this mechanism, it is not necessary to build a new cooperation system for each partner, and it is possible to freely cooperate with any system through the linkage system as long as the linkage with the standard system is built. Since data can be shared with existing systems, an existing system can be newly added to the established data sharing system, and a large-scale data sharing system can be realized relatively easily.

The output unit 74 may read out the standard specification data from the storage unit 72 and output it to the system B. In this case, the conversion from the standard specification data to the second individual specification data is not always necessary. For example, in the merchandise purchase assist system described above, the individual specification data obtained from the affiliate service as the system A may be converted into standard specification data compatible with the merchandise integration DB 13. In addition, the individual specification data acquired from the EC site 400 or 500 as the system A may be converted into standard specification data compatible with the merchandise integration DB 13. In FIG. 5, the affiliate tag acquisition unit 21 corresponds to the acquisition unit 71. The affiliate tag structure dictionary 23 corresponds to the storage unit 72 that stores the forward conversion rule. The tag analysis unit 22 corresponds to the conversion unit 73 that converts the individual specification data into the standard specification data with reference to the forward conversion rule. In FIG. 6, the merchandise-related information acquisition unit 31 corresponds to the acquisition unit 71. The page structure dictionary 33 corresponds to the storage unit 72 that stores the forward conversion rule. The page analysis unit 32 corresponds to the conversion unit 73 that converts the individual specification data into the standard specification data with reference to the forward conversion rule.

[Application of Data Linkage System]

In FIG. 10, the data linkage system 700 is connected to a shop system 710, a sales agency system 720, a content distribution system 730, and a viewing terminal 740 by wire or wireless via a data communication path.

The shop system 710 is a system of a store that sells merchandises on the Internet or at a physical store, and provides merchandise information of merchandises to be sold to the sales agency system 720 through the Internet and the data linkage system 700.

The sales agency system 720 includes a merchandise information storage unit 721, a processor 722, and a communication unit 723.

The merchandise information storage unit 721 is a storage area of a storage device such as a hard disk drive or the like, and stores therein a merchandise identifier, merchandise information, a merchandise introducer identifier, a sales shop identifier, and a distribution ratio of a sales price in association with each other.

The merchandise identifier is an identifier that can uniquely specify merchandise. The merchandise information is merchandise information acquired from the shop system 710 through the data linkage system 700 and the Internet, and includes a merchandise name, a merchandise image, a merchandise description, a merchandise price, and the like. The merchandise introducer identifier is an identifier of a merchant that introduces the product to the consumer. The sales shop identifier is an identifier of the shop system 710 that sells the merchandise or the system operator thereof. The distribution ratio indicates a ratio P:Q:R for distributing the merchandise price when the merchandise is sold to the merchandise introducer P, the operator Q of the shop system 710, and the operator R of the sales agency system 720.

The processor 722 executes various processes by executing the programs, and realizes operations of a merchandise information providing unit, a purchase processing unit, and a payment processing unit. The processor 722 may be realized by the cooperation of a plurality of processors.

The merchandise information providing unit causes the content distribution system 730 or the viewing terminal 740 to acquire the merchandise information stored in the merchandise information storage unit 721 through the Internet and the data linkage system 700 for the merchandise introducer. The purchase processing unit completes the purchase processing of the merchandise in response to the merchandise purchase request made from the viewing terminal 740. Upon detecting that the price of the purchased merchandise has been paid, the payment processing unit executes a payment processing to distribute the merchandise price to the merchandise introducer, the operator of the shop system 710, and the operator of the sales agency system 720 according to the distribution ratio.

The communication unit 723 is a communication device for communicating with the data linkage system 700 through the computer network such as the Internet or the like. The communication unit 723 transmits and receives data to and from the shop system 710, the content distribution system 730, and if necessary the viewing terminal 740, via the data linkage system 700. Here, the sales agency system 720 may be installed in the system of the merchandise integration site 100 described above. In this case, the merchandise-related information of the merchandise integration site 100 described above may be used as the merchandise information. Further, the merchandise information searched based on the search condition given from the content distribution system 730 to the retrieval conditions acquisition unit 11 may be obtained by the content distribution system 730.

The content distribution system 730 distributes the viewing content directly to the viewing terminal 740 or via the data linkage system 700 to the viewing terminal 740. The content distribution system 730 is, for example, a television receiver, a set-top box, a taxi signage, or the like, as the viewing terminal 740. Communication between the content distribution system 730 and the viewing terminal 740 is performed by a transmission path and a protocol according to the characteristics of both devices. In the following description, it is assumed that the viewing terminal 740 is a television receiver compatible with terrestrial digital broadcasting, and the content distribution system 730 includes a content server for data broadcasting.

The content distribution system 730 receives the merchandise information from the sales agency system 720 via the Internet and the data linkage system 700, and transmits the merchandise information to the viewing terminal 740 by data broadcasting.

The viewing terminal 740 receives, during the broadcast of the program selected by the view, the merchandise information of the merchandise related to the program, from the content distribution system 730 by data broadcasting, and displays the information to the display column of the data broadcast content. Further, the viewing terminal 740 accepts a purchase operation of the displayed merchandise via a remote controller.

To describe this in more detail, in this embodiment, the sales agency system 720 provides the content distribution system 730 with the merchandise information of the merchandise related to the broadcast program in association with the merchandise identifier in advance. The content distribution system 730 stores in the storage device the merchandise information received from the sales agency system 720 in association with the merchandise identifier. In addition, the content distribution system 730 stores in the storage device the received merchandise identifier in association with the broadcast program in advance. The content distribution system 730 transmits the merchandise information related to the program being broadcast in association with the merchandise identifier to the viewing terminal 740 by data broadcasting. The viewing terminal 740 displays the merchandise information of the merchandise related to the program in the data broadcast column during the broadcast of the program, and receives a purchase operation of the merchandise from the remote controller.

For example, during a program introducing Hakone, Hakone goods are on sell through data broadcasting. The viewing terminal 740 does not guide the viewer to the Internet search to sell the merchandise, but establishes the purchase of the merchandise through the data broadcast communication.

The content distribution system 730 acquires from the viewing terminal 740 the merchandise identifier of the merchandise the purchase of whose purchase has been confirmed by the operation of the viewing terminal 740. Here, a plurality of computers may exist in the content distribution system 730, and the computer for data broadcasting and the computer for receiving the purchase may be different, or communication between the computer for receiving the purchase and the viewing terminal 740 may be through the Internet. In addition, the merchandise information may be transmitted directly from the sales agency system 720 to the viewing terminal 740 via the Internet and the data linkage system 700 by a method such as a hybrid cast, or the like. Similarly, the purchased merchandise identifier may be directly transmitted from the viewing terminal 740 to the sales agency system 720. When the identifier of the purchased merchandise is notified to the content distribution system 730, the content distribution system 730 transmits the merchandise identifier to the sales agency system 720 via the data linkage system 700.

The sales agency system 720 receives the identifier of the purchased merchandise from the viewing terminal 740 or the content distribution system 730. The purchase processing unit notifies the viewing terminal 740 of a notification that the purchase of the merchandise has been accepted, either directly to the viewing terminal 740 or through the content distribution system 730 to the viewing terminal 740. The purchase processing unit notifies the shop system 710 corresponding to the purchased merchandise of the purchase detail of the merchandise. Note that, the purchase processing unit may obtain the identifier of the viewing terminal 740 via the viewing terminal 740 or the content distribution system 730, obtain, from the database, the address and name of the delivery destination which has been associated with the terminal identifier in advance, and display them on the purchase detail.

Upon detecting a predetermined payment made by the viewer of the viewing terminal 740, the payment processing unit executes a payment process to divide, in accordance with the distribution ratio corresponding to the purchased merchandise, the merchandise price into a referral fee for the merchandise introducer (such as the operator of the content distribution system 730, or the broadcasting station), the sales for the operator of the shop system 710, and the commission for the operator of the sales agency system 720, and pay them. Note that in a case where the sales agency system 720 and the data linkage system 700 are operated integrally, the commission for the operator of the sales agency system 720 may be regarded as the commission for the operator of the data linkage system. Here, the settlement performed by the viewer may be performed by transferring the merchandise price to a transfer destination displayed on the television screen. As described above, the data linkage system 700 links the systems by performing data conversion of the communication between the systems in real time.

According to the above system, it is possible to immediately purchase a product related to the content of the broadcasting program or the like being viewed on the spot. Therefore, it is possible to increase the purchase rate of the product as compared with a case where the viewer is guided to an Internet search to purchase. In addition, in a case where this mechanism links data between IoT terminals such as televisions, refrigerators, vending machines, or the like and each sales site, others can widely and easily sell products and services at each site. Note that the term "others" include television stations, vending machine vendors, taxi companies, train stations, airports, other companies and individuals, and the like. Furthermore, profits can be divided among the site operator, the seller, and the linkage system operator. Note that the linkage system and the profit distribution system may be integrated, may link through another system, or may be operated by different companies.

Conclusion

The scope of the invention is not limited to the above embodiment, but is the scope of the invention recited in the claims. Specific information processing technology on each system and specific information communication technology between the systems can be replaced by a technology known to those skilled in the art. For example, a system may be configured with a serverless architecture. In some cases, the same processing result can be obtained even if the processing order of the process is partially changed. In addition, the merchandise purchase assist system described above integrates merchandise from multiple sales sites that provide affiliate services and merchandise from multiple sales sites that do not provide affiliate services into an integrated site, and realizes a cross-search of the merchandise, so as to allow purchases of the searched merchandise. However, the invention of the merchandise purchase assist system is not limited to this, and may be any system in which merchandise from sales sites that do not provide affiliate services are at least integrated into an integrated site to realize a cross-searching of the merchandise between the sales sites. Further, the data linkage system may not take the form of an integrated site, but may be configured as a single linkage system that converts data of the system A into standard data and converts it into individual specification data of the system B.

EXPLANATION OF REFERENCE NUMERALS

11: Retrieval conditions acquisition unit
12: Retrieval unit
13: Merchandise integration DB
14: Retrieval results generation unit
15: Sorting conditions acquisition unit
21: Affiliate tag acquisition unit
22: Tag analysis unit
23: Affiliate Tag Structure Dictionary
31: Merchandise-related information acquisition unit 31
32: Page analysis unit
33: Page structure dictionary
41: Browsing processing unit
42: Automatic input processing unit
43: Personal information providing unit
44: Personal Information DB
71: Acquisition unit
72: Storage unit
73: Conversion unit
74: Output unit
100: Merchandise integration site system
200, 300: Online mall system
400, 500: EC site system
600: Purchaser interface system
700: Data linkage system
710: Shop system
720: Sales agency system
721: Merchandise information storage unit
722: Processor
723: Communication unit
730: Content distribution system
740: Viewing terminal

The invention claimed is:

1. A data linkage system to allow data dealt by one system to be dealt by another system, comprising:
an acquisition unit that acquires data having a first individual specification from the one system;
a storage unit that stores a forward conversion rule to convert data having an individual specification to data having a standard specification; and
a conversion unit that converts, with reference to the forward conversion rule, the data having the first individual specification to data having the standard specification,
wherein the storage unit stores the converted data having the standard specification
wherein
the storage unit stores a reverse conversion rule to convert data having the standard specification to data having an individual specification,
the conversion unit converts, with reference to the reverse conversion rule, the converted data having the standard specification to data having a second individual specification,
the data linkage system further comprises an output unit that outputs the converted data having the second individual specification to the another system,
the storage unit stores, for each of system idoentifiers, the forward conversion rule and the reverse conversion rule associated with each system identifier and the timing of outputting the converted data having the second individual specification to the another system, in association with each other,
the acquisition unit acquires, from the one system, a system identifier of the one system and a system identifier of the another system,
the conversion unit converts, based on the forward conversion rule associated with the system identifier of the one system, the data having the first individual specification to the data having the standard specification, and converts, based on the reverse conversion rule associated with the system identifier of the another system, the data having the standard specification to the data having the second individual specification,
the output unit executes, based on a predetermined output timing, one of: a real time process that immediately outputs the data having the second individual specification stored in the storage unit to the another system; and a scheduled process that outputs the data having the second individual specification stored in the storage unit to the another system according to a schedule, monitors output timing and, when an output time for outputting to the another system arrives according to the real time process or according to the schedule, reads the second individual specification and outputs the data having the second individual specification to the another system at the output time.

2. A data linkage method to allow data dealt by one system to be dealt by another system, comprising:
acquiring data having a first individual specification from the one system;
converting, with reference to a forward conversion rule, which is stored in a storage unit, for converting data having an individual specification to data having a standard specification, the data having the first individual specification to data having the standard specification; and
storing the converted data having the standard specification into the storage unit,
wherein
converting further comprises
storing, in the storage unit, a reverse conversion rule to convert data having the standard specification to data having an individual specification, and
converting, with reference to the reverse conversion rule, the converted data having the standard specification to data having a second individual specification,
the data linkage method further comprises outputting the converted data having the second individual specification to the another system,
acquiring data further comprises acquiring, from the one system, a system identifier of the one system and a system identifier of the another system,
converting further comprises
storing, in the storage unit, for each of system identifiers, the forward conversion rule and the reverse conversion rule associated with each system identifier and the timing of outputting the converted data having the second individual specification to the another system, in association with each other, and
converting, based on the forward conversion rule associated with the system identifier of the one system, the data having the first individual specification to the data having the standard specification, and converting, based on the reverse conversion rule associated with the system identifier of the another system, the data having the standard specification to the data having the second individual specification, and
outputting the converted data further comprises executing, based on a predetermined output timing, one of: a real time process that immediately outputs the data having the second individual specification stored in the storage unit to the another system; and a scheduled process that outputs the data having the second individual specification stored in the storage unit to the another system according to a schedule, monitors output timing and, when an output time for outputting to the another system arrives according to the real time process or according to the schedule, reads the second individual specification and outputs the data having the second individual specification to the another system at the output time.

3. A non-transitory computer-readable storage medium storing a data linkage program to allow data dealt by one system to be dealt by another system, the linkage program, when executed, causing a processer to perform operations comprising:
acquiring data having a first individual specification from the one system;
converting, with reference to a forward conversion rule, which is stored in a storage unit, for converting data having an individual specification to data having a standard specification, the data having the first individual specification to data having the standard specification; and
storing the converted data having the standard specification into the storage unit,
wherein
converting further comprises
storing, in the storage unit, a reverse conversion rule to convert data having the standard specification to data having an individual specification, and
converting, with reference to the reverse conversion rule, the converted data having the standard specification to data having a second individual specification,
the operations further comprise outputting the converted data having the second individual specification to the another system,
acquiring data further comprises acquiring, from the one system, a system identifier of the one system and a system identifier of the another system,
converting further comprises
storing, in the storage unit, for each of system identifiers, the forward conversion rule and the reverse conversion rule associated with each system identifier and the timing of outputting the converted data having the second individual specification to the another system, in association with each other, and
converting, based on the forward conversion rule associated with the system identifier of the one system, the data having the first individual specification to the data having the standard specification, and converting, based on the reverse conversion rule associated with the system identifier of the another system, the data having the standard specification to the data having the second individual specification, and
outputting the converted data further comprises executing, based on a predetermined output timing, one of: a real time process that immediately outputs the data having the second individual specification stored in the storage unit to the another system; and a scheduled process that outputs the data having the second individual specification stored in the storage unit to the another system according to a schedule, monitors output timing and, when an output time for outputting to the another system arrives according to the real time process or according to the schedule, reads the second individual specification and outputs the data having the second individual specification to the another system at the output time.

* * * * *